United States Patent Office 3,425,824
Patented Feb. 4, 1969

3,425,824
PROCESS OF REDUCING METAL ORES
Guenter Heitmann, Frankfurt-Niederrad, Germany, assignor to Metallgesellschaft A.G., Frankfurt am Main, Germany, a corporation of Germany
No Drawing. Filed June 1, 1966, Ser. No. 554,335
Claims priority, application Germany, June 23, 1965, M 65,692
U.S. Cl. 75—33     5 Claims
Int. Cl. C21b 13/08

ABSTRACT OF THE DISCLOSURE

Improved method of reducing iron ore by using a liquid carbonaceous reducing agent, in a rotary kiln by impregnating the liquid carbonaceous reducing agent in a porous carrier of coke, coal or pelletized ore and feeding the impregnated carrier to a point in the kiln where the temperature is at least 600° C.

---

This invention relates to the reduction of metal ores. It more particularly refers to the reduction of the oxide content of metallic ores, whereby the uncombined metal content thereof is increased.

It is of course recognized that many metal ores contain their metal content in combined form, often as oxides. In recovering metal from its ore, it is necessary to reduce the combined metal to uncombined metal. This can be accomplished in many ways, such as for example, electrolytically or with hydrogen treatment. It is also known to effect metal ore reduction by treatment with a hydrocarbon source such as fuel oil or "waste" hydrocarbon.

In order to properly and economically reduce metal ore to metal, it is usually necessary to heat the ore to such a temperature as will cause and sustain reaction between the reducing agent and the reducible metal compounds. It has been proposed, to combine the reduction and heating into a single operation by burning the hydrocarbon source in combination with a deficiency of oxygen. In this type of operation, the carbon black resulting from combustion, is deposited on the ore being reduced. This ore having carbon black deposited thereon is then subjected to reducing conditions with the carbon acting as the reducing agent. Reduction may for example be accomplished in a blast furnace or a reducing kiln.

As will be appreciated, ore reduction is often an endothermic reaction and so requires the addition of heat to the system. It has sometimes been found expedient to utilize a liquid petroleum fuel to provide the heat input necessary to sustain the reaction. Such liquid petroleum products have sometimes been impregnated into the ore and thus utilized to both provide the reducing agent and to provide the heat input necessary to sustain the reduction reaction. It has also been found expedient in some cases to provide the additional heat required to sustain endothermic reduction by the use of heat transfer fluids. These secondary heat sources are generally heated outside the reducing zone and then fed thereto, wherein they give up their retained heat to the ore and to the reducing agent such that the reduction reaction can proceed.

Although processes of the type generally described above have been used, they suffer from some disadvantages and economic inefficiencies which it would be desirable to overcome. The most important disadvantage of prior processes is the fact that they provide for only incomplete utilization of the petroleum fuel since a part of this fuel vaporizes in the reducing zone and is thereby lost to the process. It is obvious that the greater the loss of fuel through vaporization, the greater will be the economic inefficiency of the process. This is particularly true of prior art processes which employ the liquid fuel in the form of an impregnant in the ore to be reduced since the porosity of the ore is quite limited. Additional liquid fuel must therefore be added and the fuel tends to vaporize and undergo cracking to still more volatile hydrocarbon fractions. It also happens that the fuel cracks on the surface of the ore charge but this is no help in retaining the fuel in usable form as a reducing agent in proximity to the ore charge. This tendency to lose petroleum fuel from the reducing zone as a vapor is particularly bad where fuel impregnated ore is charged to the top of the reducing kiln, as is the usual practice. In this case, the fuel tends to vaporize and be vented as exhaust gas before it has an opportunity to be cracked to produce solid carbon reducing agent in the ore interstices. Thus, the liquid reducing agent fuel is inefficiently used.

It is an object of this invention to provide an improved process for the treatment of metal ores.

It is another object of this invention to provide an improved reduction process for metal ores.

It is a further object of this invention to provide an improved process, whereby metal ores are reduced by the use of liquid fuels as the reducing agency.

Other and additional objects of this invention will become apparent from a consideration of this entire specification including the claims appended hereto.

In accord with and fulfilling these objects, this invention resides, in one of its aspects, in introducing liquid fuel for use in reducing processes in the form of an impregnant in a carrier other than the unprocessed ore being processed.

It has been found to be quite suitable to use substantially any porous material as the impregnated carrier for the liquid fuel. It is preferred in the practice of this invention to employ coke or coal as the impregnated carrier. Also suitable for use as the impregnated carrier is coked pelletized coal which is desirable because of its high porosity. It is within the scope of this invention to utilize as the fluid fuel carrier pelletized ore being treated.

It is to be understood that in the prior art, untreated ore has sometimes been used as impregnated carrier for fluid fuel. However, as set forth above, this was found to be unsuitable because of the low porosity of the ore. Upon pelletization, it has been found that the ore now has sufficiently high porosity to be able to carry sufficient liquid fuel to be useful in the practice of this invention. One particularly expeditious manner of providing such impregnated pelletized ore is to prepare such pellets in the usual manner, but to use the fluid fuel as the pelletizing liquid rather than the commonly used water.

Carriers having a porosity of at least about 40% are considered to be well suited to use in this invention. Such materials as have been mentioned above as satisfactory carriers, have the required porosity.

It has been found suitable to practice this invention by impregnating a suitable carrier as set forth above with a liquid fuel, preferably heavy fuel oil or waste hydrocarbons; introducing the impregnated carrier material into the reducing zone at a point in such zone where the temperature is at a temperature of at least about 600° C., preferably at least about 900° C.; charging the ore to be reduced to the reducing zone; and reducing the ore to its metallic state.

It is preferred in the pratcice of this invention that the reducing zone be charged, at the point of entry of the impregnated carrier, to an extent such that the bulk volume of the charge is at least about 10 percent and most preferably at least about 15 percent or more of the cross-sectional area of the kiln. It is possible to obtain this bulk volume by introduction of charged ore and other possible additives at an appropriate rate above the reducing zone, preferably into the uppermost part of the reducing zone where such is a kiln, particularly a rotary kiln. The kiln charge may comprise ore to be reduced, materials for admixture with the charged ore or with the product metal and in some cases solid reducing agent, such as coal, may be included in the ore charge.

A special advantage is obtained where pelletized carrier material impregnated with liquid reducing agency fuel is used in the process of this invention. It is possible through this use to recover and economically use the fines produced in a process for reducing metal ores. Thus, the coal fines or ore fines or a mixture of the two may be pelletized using a suitable liquid fuel as the pelletizing liquid to produce impregnated pellets which are quite useful in the practice of this invention. Unexpectedly, the impregnated pellets which have been produced of fines with the aid of fluid fuel pelletizing liquid and impregnant, show a remarkably high degree of cohesion within the reducing zone and show very little, if any, tendency to produce additional dust or fines in the reduction process.

The oil-impregnated, porous carriers may be generally introduced into the kiln in any suitable manner. They are preferably charged into the kiln pneumatically, that is by blowing. In this embodiment of the invention it is suitable to use carriers having a large particle size range, e.g., throughout the range from 2 to 15 millimeters. Such particulate carrier materials having a larger particle size range are more readily accessible than those having a closely limited particle size range and afford the further advantage that when pneumatically charged the carriers fall in a uniform distribution on the charge of the kiln through a larger part of the kiln length.

Contrary to known processes, the cracking of the fuel oil in the process according to the invention is not restricted to the surface of the charge bed or to the gas space but takes place within the charge bed and mainly in the interior of the carrier substance. The cracked carbon is thus retained and fully utilized as a reducing agent. The cracked reducing gases are also fully effective as a reducing agent as they flow through the kiln ore charge. As far as the components of the cracked gaseous products are not utilized for the reduction, they may be utilized in known manner by combustion, mainly in the uppermost part of the kiln, for supplying the required heat, particularly for heating the kiln charge to the reaction temperature. This affords the further advantage that these cracked products are more readily combustible than the heavy oil preferably used as a reducing agent so that simple burners and air inlet pipes are sufficient for a formation of flames and the complicated and expensive heavy oil burners are no longer required.

The long flames formed by the combustion of the remaining cracked products also have the advantage that they enable more accurate temperature control with a lower danger of overheating than with the short flames obtained by a direct combustion of heavy oil.

The following example is given by way of illustration of the invention and is in no way limiting thereon.

Example

A rotary kiln is charged at the top with 100 parts by weight of iron ore and 20 parts by weight of coal. Coke impregnated with residual fuel oil is charged to the kiln about ⅔ down from the top thereof such that the total charge of fixed carbon carriers is about 50 parts by weight. The kiln is heated by blowing air into it and igniting the combustible contents thereof. After about 4 hours of treatment, the kiln content were analyzed and found to contain about 75 parts of iron which represented a conversion of about 95% iron from the combined ore form to the metal.

What is claimed is:

1. In the process for producing metal by the direct reduction of metal ore at elevated temperatures below the melting point of said ore in a rotary kiln with a liquid reducing agent; the improvements which comprise impregnating said liquid reducing agent into a porous carrier comprising at least one member of the group consisting of coke, coal and pelletized ore, feeding said impregnating carrier into said kiln at a point where the temperature of said kiln is at least about 600° C. and feeding said ore to said kiln upstream of the point at which said impregnated carrier is fed to said kiln.

2. The improved process claimed in claim 1, wherein the bulk volume of the contents of the reduction zone at the point of feed of said impregnated carrier is at least about 15% of the cross sectional area of the kiln.

3. The improved process claimed in claim 1, wherein pelletized carrier material is produced utilizing the impregnant as the pelletizing fluid.

4. The improved process claimed in claim 1, wherein said impregnated carriers have a particle size of about 2 to 15 millimeters.

5. The improved process claimed in claim 1, wherein said carriers are pelletized and wherein the material from which said pellets are produced constitute fines recovered from said reduction process.

References Cited

UNITED STATES PATENTS

| 894,796 | 7/1908 | Kendall | 75—33 |
| 1,415,036 | 5/1922 | Hoopes | 75—4 |
| 2,072,072 | 2/1937 | Hartgen | 75—33 |
| 2,863,758 | 12/1958 | Crane et al. | 75—4 |
| 3,305,345 | 2/1967 | Rausch et al. | 75—33 |

HYLAND BIZOT, *Primary Examiner.*

H. W. TARRING, *Assistant Examiner.*

U.S. Cl. X.R.

75—4, 36